United States Patent
Karam et al.

(10) Patent No.: US 8,675,524 B2
(45) Date of Patent: Mar. 18, 2014

(54) METHOD AND APPARATUS FOR DYNAMICALLY ALLOCATING RESOURCES FOR LARGE-SCALE MULTIMEDIA CONFERENCES

(75) Inventors: Gerald Karam, Morristown, NJ (US); Eric Cheung, New York, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 250 days.

(21) Appl. No.: 12/565,609

(22) Filed: Sep. 23, 2009

(65) Prior Publication Data
US 2011/0069642 A1    Mar. 24, 2011

(51) Int. Cl.
*H04L 29/06* (2006.01)

(52) U.S. Cl.
USPC ........... 370/260; 370/263; 370/468; 709/204; 709/226; 348/14.09

(58) Field of Classification Search
USPC ................. 370/352, 401, 389, 466, 260–263; 709/204, 242, 226, 222, 224; 455/518; 348/14.09
See application file for complete search history.

(56) References Cited

U.S. PATENT DOCUMENTS

| | | | |
|---|---|---|---|
| 6,747,970 B1 * | 6/2004 | Lamb et al. | 370/352 |
| 7,581,008 B2 * | 8/2009 | Zhang et al. | 709/226 |
| 8,150,917 B2 * | 4/2012 | Sekaran et al. | 709/204 |
| 2004/0006595 A1 * | 1/2004 | Yeh et al. | 709/204 |
| 2006/0153352 A1 * | 7/2006 | Schmidt et al. | 379/202.01 |
| 2007/0233866 A1 * | 10/2007 | Appleby et al. | 709/226 |
| 2008/0104170 A1 * | 5/2008 | Ananthanarayanan | 709/204 |
| 2009/0287846 A1 * | 11/2009 | Iyengar et al. | 709/242 |
| 2010/0134589 A1 * | 6/2010 | Zhang et al. | 348/14.09 |

* cited by examiner

*Primary Examiner* — Charles C Jiang
*Assistant Examiner* — Mohamed Kamara

(57) ABSTRACT

In one embodiment, the present invention is a method and apparatus for dynamically allocating resources for large-scale multimedia conferences. In one embodiment, a method for allocating resources to a multimedia conference includes receiving a request from a potential participant to join the multimedia conference and dynamically assigning the request to one of a plurality of media servers serving the multimedia conference.

15 Claims, 3 Drawing Sheets

METHOD AND APPARATUS FOR DYNAMICALLY ALLOCATING RESOURCES FOR LARGE-SCALE MULTIMEDIA CONFERENCES

FIELD OF THE INVENTION

The present invention relates generally to multimedia conferencing applications and relates more particularly to the allocation of resources for large-scale multimedia conferences.

Conventional multimedia conferencing applications are implemented by an application server acting in conjunction with one or more media servers. The application server hosts the conferencing application, while the media server processes the media streams associated with the calls or connections hosted by the application server. For example, the media server mixes audio streams together so that the conference participants can hear each other.

The capacity of a media server is limited by the number of ports that it has; for example, a media server with one thousand ports is capable of mixing audio streams from one thousand conference participants at a time. Thus, for large-scale conferencing applications (e.g., involving more than one thousand conference participants), multiple media servers may be needed to support a given conference.

Typically, media servers must be reserved in advance of a conference in order to ensure that the conferencing application has the capacity to support all of the conference participants. That is, the application server must know, in advance, where to send requests for media stream processing. This makes it nearly impossible to provide dynamic support for large-scale media conferencing applications.

SUMMARY OF THE INVENTION

In one embodiment, the present invention is a method and apparatus for dynamically allocating resources for large-scale multimedia conferences. In one embodiment, a method for allocating resources to a multimedia conference includes receiving a request from a potential participant to join the multimedia conference and dynamically assigning the request to one of a plurality of media servers serving the multimedia conference.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is a method and apparatus for dynamically allocating resources for large-scale multimedia conferences. Embodiments of the invention provide a pool of media servers that are accessible by an application server. When a request to join a conference is received by the application server, the request is forwarded to a load balancer, which in turns forwards the request to one of the servers in the pool. In this way, the load balancer dynamically distributes requests across the pool of servers. Thus, the application server does not need to know in advance to which media server requests should be forwarded.

Figure 1:
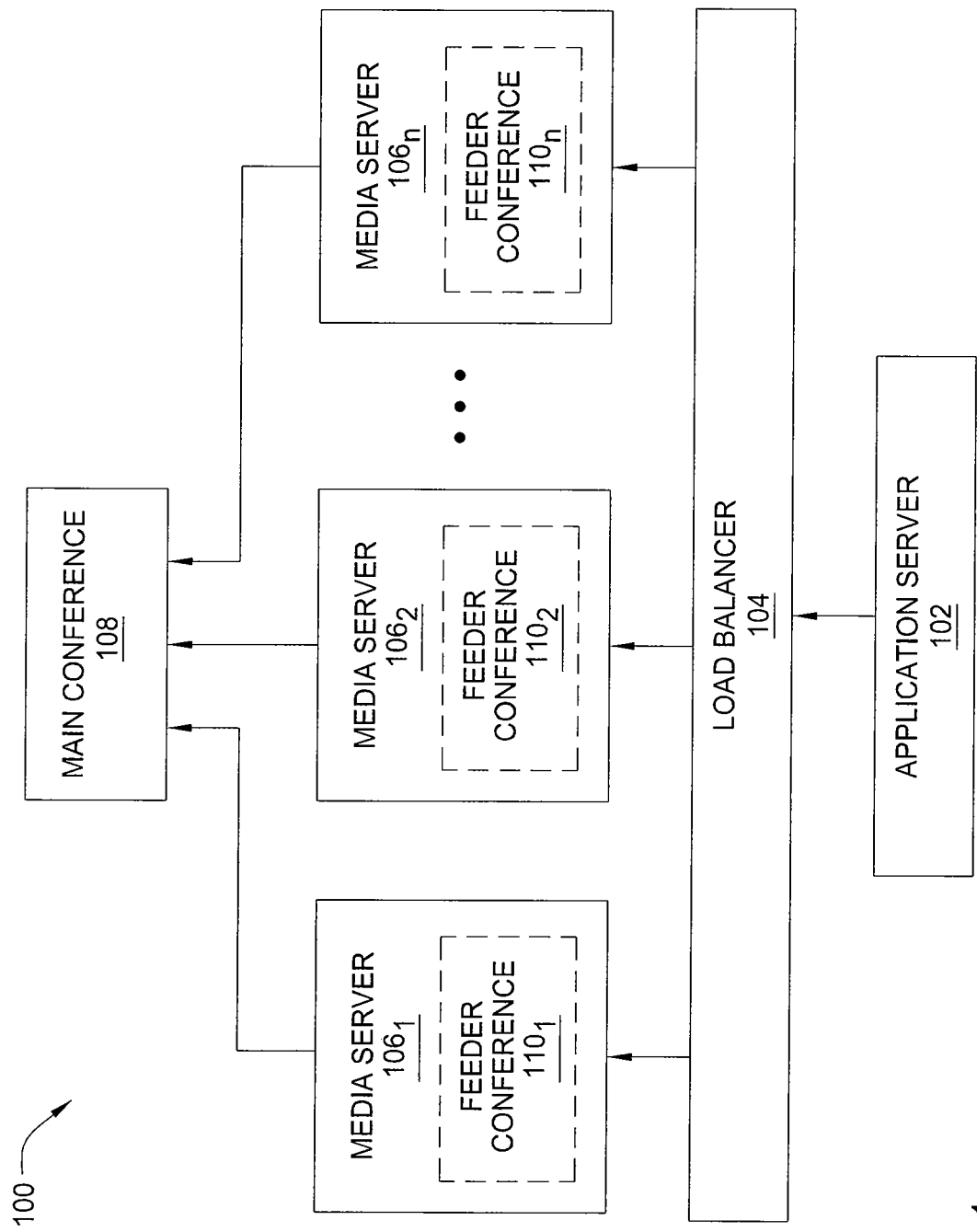
FIG. 1 is a block diagram illustrating one embodiment of a system for providing a multimedia conference, according to the present invention.

FIG. 1 is a block diagram illustrating one embodiment of a system 100 for providing a multimedia conference, according to the present invention. As illustrated, the system 100 comprises an application server 102, a load balancer 104, and a plurality of media servers $106_1$-$106_n$ (hereinafter collectively referred to as "media servers 106"), all of which are configured to collectively provide a main conference 108 in which conference participants can interact.

The application server 102 hosts a multimedia conferencing application that allows conference participants to connect to the main conference 108. To this end, the application server 102 receives requests from potential conference participants who wish to participate in the main conference 108. In one embodiment, the requests arrive in the form of data streams, where data contained in the streams comprises at least one of: audio data or visual data. The application server 102 is coupled to the load balancer 104 and is further configured to forward requests from potential conference participants to the load balancer 108.

The load balancer 104 is configured to receive the requests from the application server 102 and to assign the requests to the media servers 106 for processing. To this end, the load balancer 104 monitors the usage statistics regarding the media servers 106, and these usage statistics are used to make the assignments. The load balancer 104 is coupled to the media servers 106 and is further configured to forward requests from the application server 102 to one of the media servers 106.

The media servers 106 are configured to process requests forwarded by the load balancer 104. In particular, each of the media servers 106 hosts at least one feeder conference $110_1$-$110_n$ (hereinafter collectively referred to as "feeder conferences 110") in which processing of the data streams comprising the requests occurs. In addition, once a request has been assigned to a media server 106, that media server 106 continues to process data streams from the user associated with the request, via the feeder conference 110. This processing may include, for example, mixing of audio streams. The media servers 106 are coupled to the main conference 108 and are further configured to forward processed data streams to the main conference 108.

This cascading arrangement of a main conference and a plurality of feeder conferences greatly increases the maximum number of participants allowable on a single conference session. For example, if the maximum capacity of a media server is n participants, a main conference may be connected to n feeder conferences, and each feeder conference may serve n participants. Therefore the maximum capacity of the conference session becomes $n^2$.

As discussed above, the main conference comprises a multimedia conference in which a plurality of participants interacts using any one or more of a plurality of modalities. In one embodiment, these modalities include at least one of: audio or video.

Thus, the use of the load balancer 104 allows conference participants to be dynamically added to the feeder conferences 110 across the available media servers 106. The application server 102 that hosts the conferencing application does not need to reserve a particular media server 106 for the feeder conferences 110 or have any other sort of advance knowledge regarding which media server(s) will serve the feeder conferences 110.

Figure 2:
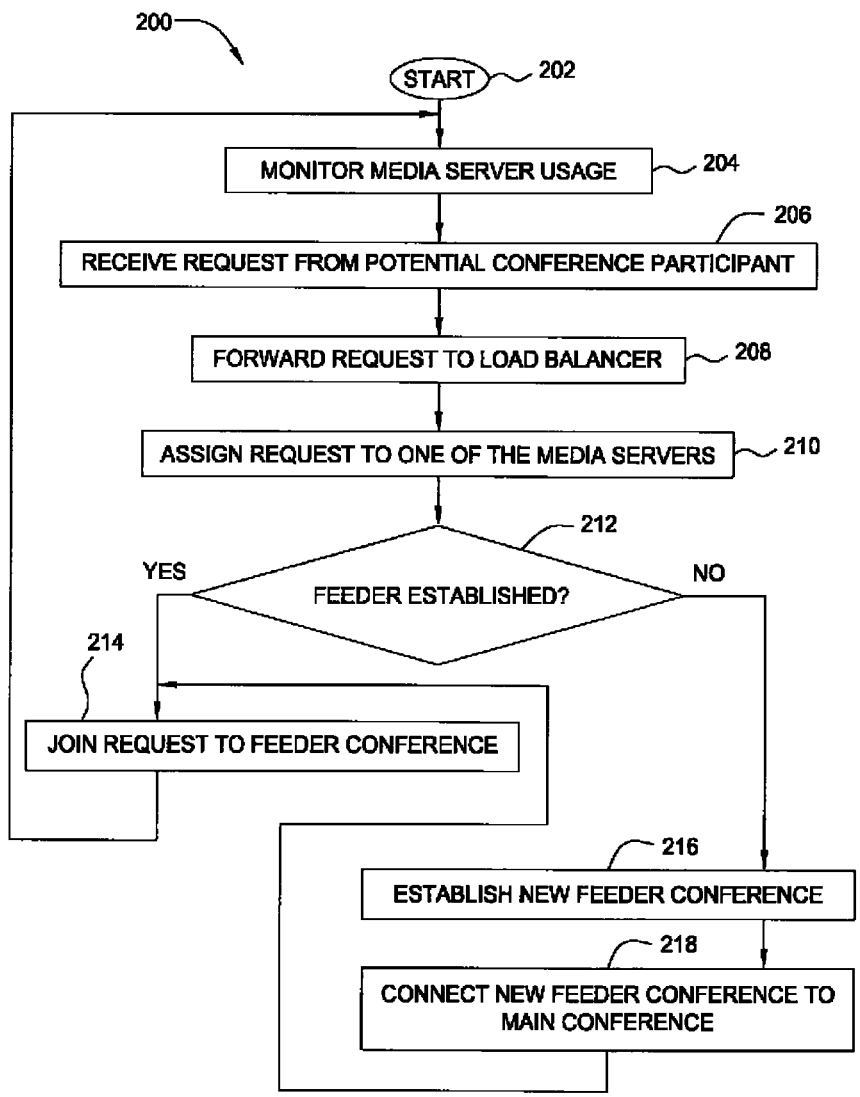
FIG. 2 is a flow diagram illustrating one embodiment of a method for providing a multimedia conference, according to the present invention.

FIG. 2 is a flow diagram illustrating one embodiment of a method 200 for providing a multimedia conference, according to the present invention. The method 200 may be implemented, for example, by the system 100 illustrated in FIG. 1. As such, reference is made in the discussion of the method 200 to various components of the system 100. However, it will be appreciated that the method 200 is not limited to operation in conjunction with the system 100 and may well have application in multimedia conferencing systems with alternative configurations.

The method 200 is initialized at step 202 and proceeds to step 204, where the load balancer 104 monitors the usage of the media servers 106. In one embodiment, this involves monitoring one or more statistics related to the usage of each media server 106, such as percentage of memory or processing currently being consumed.

In step 206, the application server 102 receives a request from a potential conference participant to join the main conference 108. The application server 102 then forwards the request to the load balancer 104 in step 208.

In step 210, the load balancer 104 assigns the request to one of the media servers 106. The assignment is made in accordance with the usage statistics monitored by the load balancer 104. For example, in one embodiment, assignments are made such that all incoming requests are distributed substantially uniformly across all of the available media servers 106 (i.e., such that the usage of all of the media servers is substantially the same). In other embodiments, however, distribution need not be made uniformly and may be made in accordance with other criteria (e.g., the cost of operation for the media servers, the maintenance schedule for the media servers, etc.).

In step 212, the assigned media server 106 determines whether it is already established a feeder conference 110 for the main conference 108. If the assigned media server 106 concludes in step 212 that it has already established a feeder conference 110 for the main conference 108, then the method 200 proceeds to step 214, and the assigned media server 106 joins the request to the feeder conference 110. Once the request is joined to the feeder conference 110, the assigned media server 106 will process data streams from the conference participant associated with the request and forward the processed data streams, via the feeder conference 110, to the main conference 108.

Alternatively, if the assigned media server 106 concludes in step 212 that it has not established a feeder conference 110 for the main conference 108, then the method 200 proceeds to step 216, and the application server 102 establishes a new feeder conference 110 on the assigned media server 106. The application server then connects the new feeder conference 110 to the main conference 108 in step 218.

Once the new feeder conference 110 is connected to the main conference 108, the method 200 proceeds to step 214, and the assigned media server 106 joins the request to the new feeder conference 110, as discussed above. Once the new request has been joined to the appropriate feeder conference 110 (which is, in turn, connected to the main conference 108), the method 200 returns to step 204 and proceeds as described above. Thus, the system 100 continues to monitor media server usage and to process incoming requests from potential conference participants.

Figure 3:
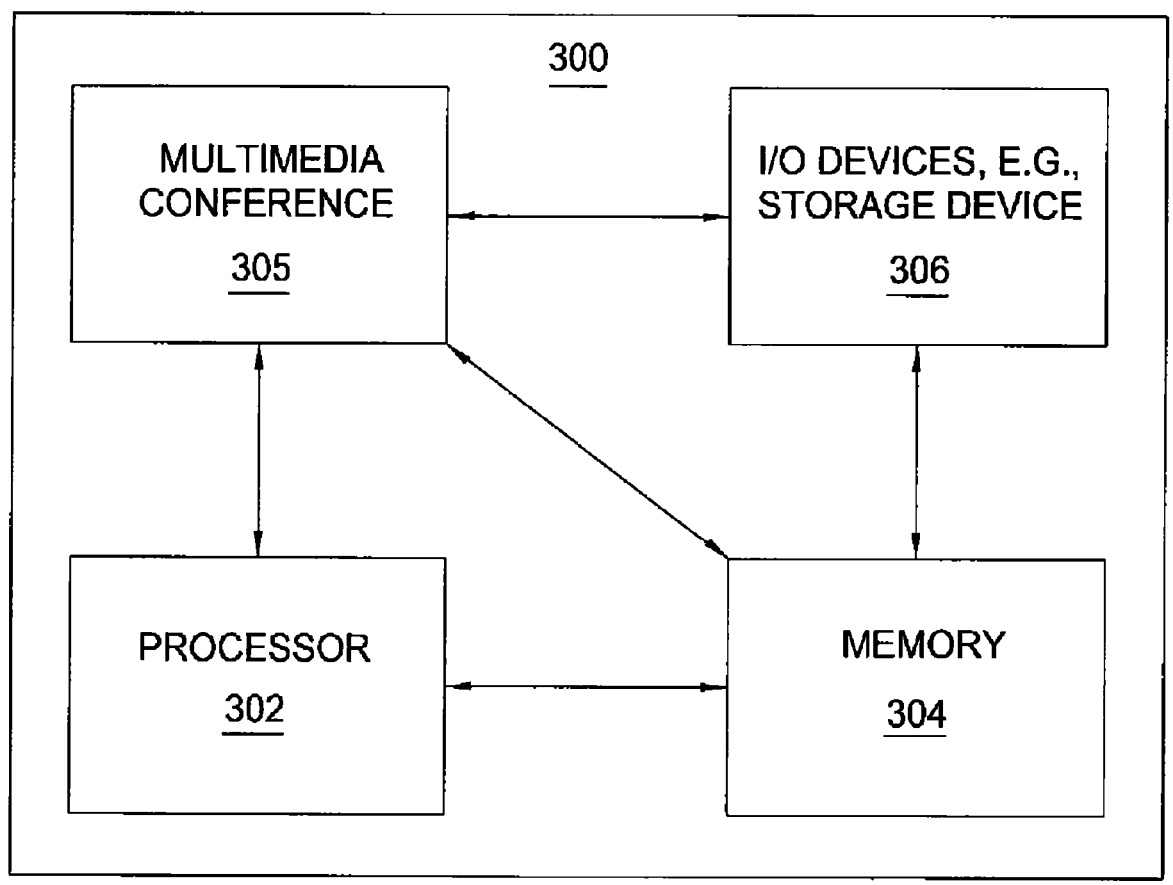
FIG. 3 is a high level block diagram of the multimedia conference provision method that is implemented using a general purpose computing device.

FIG. 3 is a high level block diagram of the multimedia conference provision method that is implemented using a general purpose computing device 300. The general purpose computing device 300 may be part of a system for providing a multimedia conference, for example. In one embodiment, a general purpose computing device 300 comprises a processor 302, a memory 304, a multimedia conference module 305 and various input/output (I/O) devices 306 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the multimedia conference module 305 can be implemented as a physical device or subsystem that is coupled to a processor through a communication channel.

Alternatively, the multimedia conference module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the multimedia conference module 305 for dynamically allocating resources for large-scale multimedia conferences described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allocating one of a plurality of media servers to a multimedia conference, comprising:
receiving, by a processor, a request from a potential participant to join the multimedia conference after the multimedia conference is established between a plurality of participants, wherein each one of the plurality of participants is assigned to a feeder conference processed by a respective one of the plurality of media servers, wherein the respective one of the plurality of media servers continues to process data streams from a participant of the plurality of participants that is assigned to the feeder conference hosted by the respective one of the plurality of media servers and forwards the data streams that are processed to the multimedia conference;
dynamically assigning, by the processor, the request to join the multimedia conference that is already established to one of a plurality of media servers serving the multimedia conference, wherein the dynamically assigning comprises an ability to assign the request to any one of the plurality of media servers;
processing, by the processor, the request using a feeder conference established on the one of the plurality of media servers, wherein the feeder conference is joined to the multimedia conference and a subsequent data stream is forwarded to the multimedia conference via the feeder conference, wherein the feeder conference and the multimedia conference comprise a cascading arrangement;

establishing, by the processor, the feeder conference at the one of the plurality of media servers as a new feeder conference, if the feeder conference has not been established yet; and joining, by the processor, the new feeder conference to the multimedia conference, wherein the establishing and the joining are performed prior to the processing.

2. The method of claim 1, wherein the dynamically assigning comprises:
monitoring a usage of the plurality of media servers; and
forwarding the request to the one of the plurality of media servers in accordance with the usage.

3. The method of claim 1, wherein the one of the plurality of media servers is selected to bring about a substantially uniform distribution of requests across the plurality of media servers.

4. The method of claim 1, wherein the one of the plurality of media servers is selected after the request is received.

5. The method of claim 1, further comprising:
processing the subsequent data stream received from the potential participant by the one of the plurality of media servers.

6. The method of claim 5, wherein the subsequent data stream comprises visual data.

7. A non-transitory computer readable storage medium containing an executable program which, when executed by a processor, causes the processor to perform operations for allocating one of a plurality of media servers to a multimedia conference, the operations comprising:
receiving a request from a potential participant to join the multimedia conference after the multimedia conference is established between a plurality of participants, wherein each one of the plurality of participants is assigned to a feeder conference processed by a respective one of the plurality of media servers, wherein the respective one of the plurality of media servers continues to process data streams from a participant of the plurality of participants that is assigned to the feeder conference hosted by the respective one of the plurality of media servers and forwards the data streams that are processed to the multimedia conference;
dynamically assigning the request to join the multimedia conference that is already established to one of a plurality of media servers serving the multimedia conference, wherein the dynamically assigning comprises an ability to assign the request to any one of the plurality of media servers;
processing the request using a feeder conference established on the one of the plurality of media servers, wherein the feeder conference is joined to the multimedia conference and a subsequent data stream is forwarded to the multimedia conference via the feeder conference, wherein the feeder conference and the multimedia conference comprise a cascading arrangement;
establishing the feeder conference at the one of the plurality of media servers as a new feeder conference, if the feeder conference has not been established yet; and
joining the new feeder conference to the multimedia conference, wherein the establishing and the joining are performed prior to the processing.

8. The non-transitory computer readable storage medium of claim 7, wherein the dynamically assigning comprises:
monitoring a usage of the plurality of media servers; and
forwarding the request to the one of the plurality of media servers in accordance with the usage.

9. The non-transitory computer readable storage medium of claim 7, wherein the one of the plurality of media servers is selected to bring about a substantially uniform distribution of requests across the plurality of media servers.

10. The non-transitory computer readable storage medium of claim 7, wherein the one of the plurality of media servers is selected after the request is received.

11. The non-transitory computer readable storage medium of claim 7, further comprising:
processing the subsequent data stream received from the potential participant by the one of the plurality of media servers.

12. The non-transitory computer readable storage medium of claim 11, wherein the subsequent data stream comprises visual data.

13. A multimedia conferencing system, comprising:
an application server for receiving requests from potential participants to join a multimedia conference after the multimedia conference is established between a plurality of participants;
a plurality of media servers for processing the requests, wherein each of the plurality of media servers has established thereon a feeder conference that joins the multimedia conference, wherein the feeder conference and the multimedia conference comprise a cascading arrangement, wherein the feeder conference forwards a data stream processed by one of the plurality of media servers to the multimedia conference, wherein each one of the plurality of participants is assigned to a feeder conference processed by a respective one of a plurality of media servers, wherein the respective one of the plurality of media servers continues to process data streams from a participant of the plurality of participants that is assigned to the feeder conference hosted by the respective one of the plurality of media servers and forwards the data streams that are processed to the multimedia conference; and
a load balancer coupled to the application server and to the plurality of media servers for dynamically assigning each of the requests to join the multimedia conference that is already established to one of the plurality of media servers or establishing the feeder conference at the one of the plurality of media servers as a new feeder conference, if the feeder conference has not been established yet and joining the new feeder conference to the multimedia conference, wherein the dynamically assigning comprises an ability to assign the request to any one of the plurality of media servers.

14. The multimedia conferencing system of claim 13, wherein the load balancer dynamically assigns the requests after the requests are received.

15. The multimedia conferencing system of claim 13, wherein the requests are distributed substantially uniformly across the plurality of media servers.

* * * * *